United States Patent
Tsirkin et al.

(10) Patent No.: US 11,249,777 B2
(45) Date of Patent: Feb. 15, 2022

(54) VIRTUAL MACHINE CONTEXT MANAGEMENT

(71) Applicant: Red Hat Israel, Ltd., Ra'anana (IL)

(72) Inventors: Michael Tsirkin, Raanana (IL); Paolo Bonzini, Milan (IT)

(73) Assignee: RED HAT ISRAEL, LTD., Ra'anana (IL)

( * ) Notice: Subject to any disclaimer, the term of this patent is extended or adjusted under 35 U.S.C. 154(b) by 75 days.

(21) Appl. No.: 14/328,245

(22) Filed: Jul. 10, 2014

(65) Prior Publication Data

US 2016/0011895 A1 Jan. 14, 2016

(51) Int. Cl.
*G06F 9/455* (2018.01)
*G06F 9/46* (2006.01)

(52) U.S. Cl.
CPC ......... *G06F 9/45558* (2013.01); *G06F 9/461* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 8,424,013 | B1 * | 4/2013 | Chalmer | G06F 9/461 712/244 |
| 2003/0041090 | A1 * | 2/2003 | Armstrong | G06F 9/4843 718/106 |
| 2005/0132363 | A1 * | 6/2005 | Tewari | G06F 9/45558 718/1 |
| 2005/0240816 | A1 * | 10/2005 | Iovin | G06F 11/3648 714/25 |
| 2006/0048160 | A1 * | 3/2006 | Olszewski | G06F 9/5083 718/105 |
| 2006/0248528 | A1 * | 11/2006 | Oney | G06F 9/45533 718/1 |
| 2007/0006228 | A1 * | 1/2007 | Grobman | G06F 9/461 718/1 |
| 2011/0010713 | A1 * | 1/2011 | Matsumoto | G06F 9/45541 718/1 |
| 2011/0161541 | A1 * | 6/2011 | Madukkarumukumana | G06F 9/4812 710/260 |
| 2013/0247044 | A1 * | 9/2013 | Bingham | G06F 9/45533 718/1 |

(Continued)

OTHER PUBLICATIONS

Zabaljauregui, "Hardware Assisted Virtualization Intel Virtualization Technology", Buenos Aires, Junio de 2008 (Year: 2008).*

*Primary Examiner* — Wynuel S Aquino
(74) *Attorney, Agent, or Firm* — Haynes and Boone, LLP

(57) ABSTRACT

According to one example, a method performed by a physical computing system includes, with a hypervisor, detecting that a guest system running on a virtual machine has executed a halt instruction for a virtual processor of the virtual machine. The method further includes, with a physical processor, switching from a context of the virtual machine to a context of the hypervisor. The method further includes re-entering the context of the virtual machine in response to determining that there are no tasks pending for processes outside the context of the virtual machine, the processes being for execution by the physical processor.

18 Claims, 5 Drawing Sheets

(56) References Cited

U.S. PATENT DOCUMENTS

| | | | |
|---|---|---|---|
| 2013/0347000 A1* | 12/2013 | Inoue | G06F 9/505 |
| | | | 718/105 |
| 2014/0082240 A1* | 3/2014 | Coleman | G06F 9/4812 |
| | | | 710/260 |
| 2014/0380028 A1* | 12/2014 | Cheng | G06F 9/45558 |
| | | | 713/1 |
| 2015/0006917 A1* | 1/2015 | Rash | G06F 1/26 |
| | | | 713/300 |

* cited by examiner

VIRTUAL MACHINE CONTEXT MANAGEMENT

BACKGROUND

The present disclosure relates generally to virtual systems, and more particularly, to virtual processor management.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems.

A host machine typically uses a hypervisor to virtualize the underlying hardware of the host machine or emulate hardware devices, thus making the use of the virtual machine transparent to the guest operating system or the remote client that uses the virtual machine. The hypervisor manages allocation and virtualization of computer resources. An example of computer resources is a set of processors.

SUMMARY

According to one example, a method performed by a physical computing system includes, with a hypervisor, detecting that a guest system running on a virtual machine has executed a halt instruction for a virtual processor of the virtual machine. The method further includes, with a physical processor, switching from a context of the virtual machine to a context of the hypervisor. The method further includes re-entering the context of the virtual machine in response to determining that there are no tasks pending for processes outside the context of the virtual machine, the processes being for execution by the physical processor.

According to one example, a computing system includes a processor and a memory comprising computer readable instructions that when executed by the processor, cause the system to run a hypervisor to host a virtual machine, detect that a guest system utilizing the virtual machine has executed a halt command for a virtual processor, cause the processor to exit a context of the virtual machine, determine that there are no pending processes for execution by the processor, and re-enter the context of the virtual machine.

A method performed by a physical computing system includes, with a hypervisor, detecting that a guest system running on a virtual machine has executed a halt instruction for a virtual processor of the virtual machine. The method further includes, with a physical processor of the physical system, switching from a context of the virtual machine to a context of the hypervisor. The method further includes re-entering the context of the virtual machine in response to determining that interrupts are enabled and there are no tasks pending for processes outside the context of the virtual machine, the processes being for execution by the physical processor.

Figure 1A:
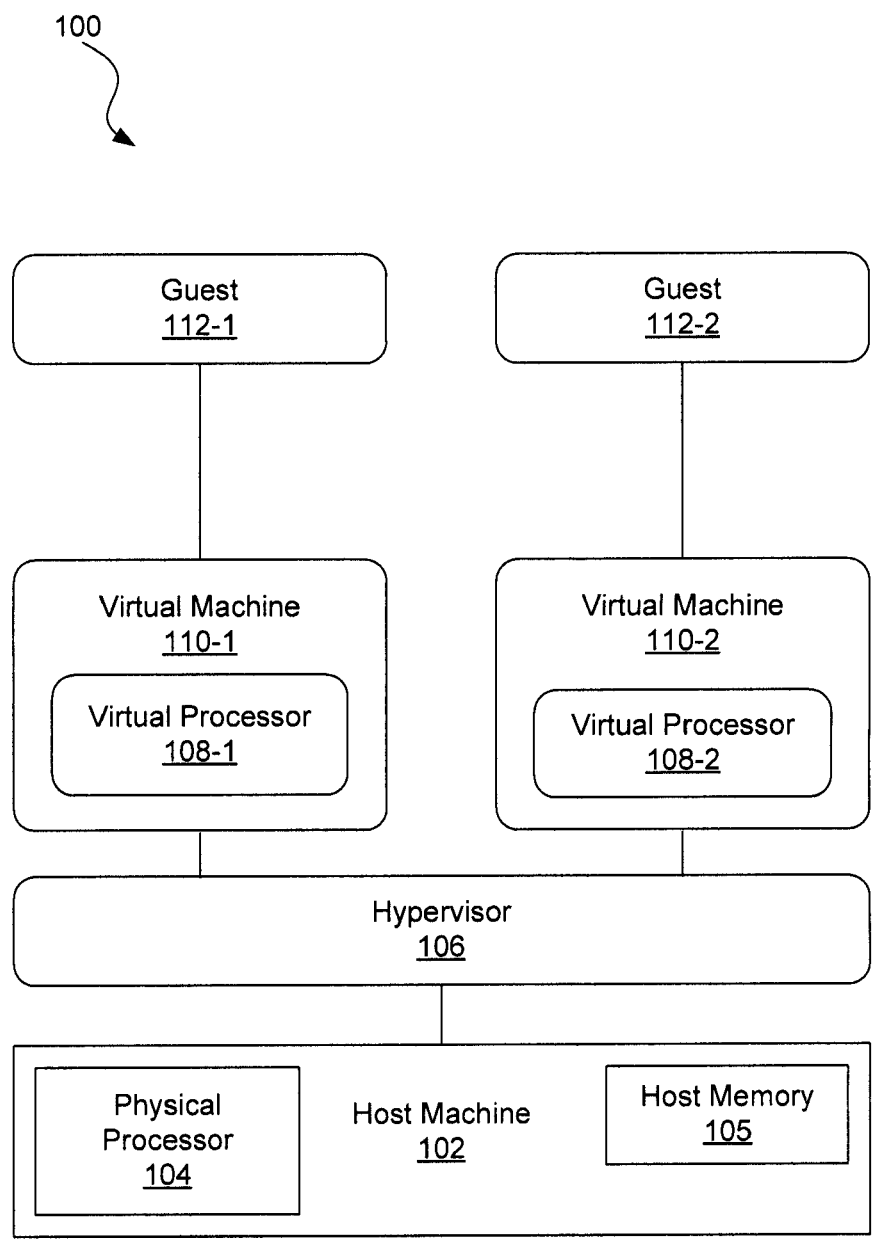
FIG. 1A is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a host machine typically uses a hypervisor to virtualize the underlying hardware of the host machine or emulate hardware devices, thus making the use of the virtual machine transparent to the guest operating system or the remote client that uses the virtual machine. The guest operating system may present the virtual machine with a set of machine readable instructions that are executed by a virtual processor of the virtual machine. One such instruction is a halt instruction. A halt instruction causes a processor to halt until an interrupt signal is received. An interrupt signal is a signal sent by a hardware device to indicate that a particular event has occurred. The interrupt signal thus informs the processor that it may continue execution of a program.

When a virtual processor of a virtual machine receives a halt instruction, the physical processor supporting the virtual machine does not halt. Because a physical processor may support several different virtual machines simultaneously, one virtual machine is not allowed to halt the physical processor. Instead, when a virtual processor executes a halt instruction, the underlying physical processor exits the context of the virtual machine. The context in which a processor operates refers to the set of data used by a particular process. This set of data may include the values within the processor registers and other values stored in other forms of memory such as processor cache or other Random Access Memory (RAM). When a processor exits a particular context, the processor generally will enter a different context. This is referred to as context switching. Context switching typically involves saving the state of the set of data associated with the context being exited and loading the set of data for the context being entered.

Modern processors are able to handle multi-tasking. Specifically, such processors may switch between several processes. This is done by executing a block of instructions for one process, and then switching to execute a block of instructions for a different process. Thus, when the virtual processor executes a halt instruction, this causes an exit from the context of the virtual machine associated with that virtual processor. An exit from the context of the virtual machine will typically cause the physical processor to switch to the context of the hypervisor. The hypervisor may then perform various administrative tasks, or the hypervisor may cause the physical processor to switch to the context of a different virtual machine that does not have a virtual processor that is in a halt state.

A processor typically executes a halt instruction when the processor has to wait on an external event before processing can continue. For example, the virtual processor may have to wait for a response from a particular piece of hardware. Computing systems generally use interrupt signals to inform processors that particular events have occurred. Thus, According to principles described herein, when a hypervisor detects that a halt instruction is executed on the virtual processor, the hypervisor checks to determine if interrupts for the underlying physical processor are enabled. If not, then the virtual processor is halted as normal. But, if interrupts are enabled, the hypervisor can then keep the virtual processor in a running state by re-entering the context of the virtual machine associated with that virtual processor. In some examples, the hypervisor can first check to make sure that no other tasks are pending for execution on the physical processor. If there are such tasks, then the virtual processor can be halted and the physical processor will switch to the context of whatever task is waiting for execution. If, however, there are no pending tasks for execution on the physical processor, then the hypervisor causes the physical processor to switch back to the context of the virtual machine. This makes it more likely that the processor will be in the context of the virtual machine when the interrupt is received. Thus, the virtual processor can leave the halt state and continue execution without additional overhead. This allows for greater efficiency of a processor that manages multiple virtual machines.

FIG. 1A is a diagram showing an illustrative system 100 involving a plurality of virtual machines 110. According to the present example, a physical system, such as a host machine 102 includes hardware such as a set of processors 104 and a memory 105. The system 100 includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run a different operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 107 or for use by the virtual machines 110. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual machines 110 and the hypervisor 106. A virtual machine exit marks the point at which a context switch occurs between the virtual machine 110 currently running and the hypervisor 106, which takes over control for a particular reason. During the context switch, the processor 104 may save a snapshot of the state of the virtual machine that was running at the time of exit. The virtual machine exit is handled by the hypervisor 106, which decides the appropriate action to take and then transfers control back to the virtual machine 110 via a virtual machine entry. A virtual machine entry marks the point at which a context switch occurs between the hypervisor 106 and a virtual machine 110, which takes over control.

Figure 1B:
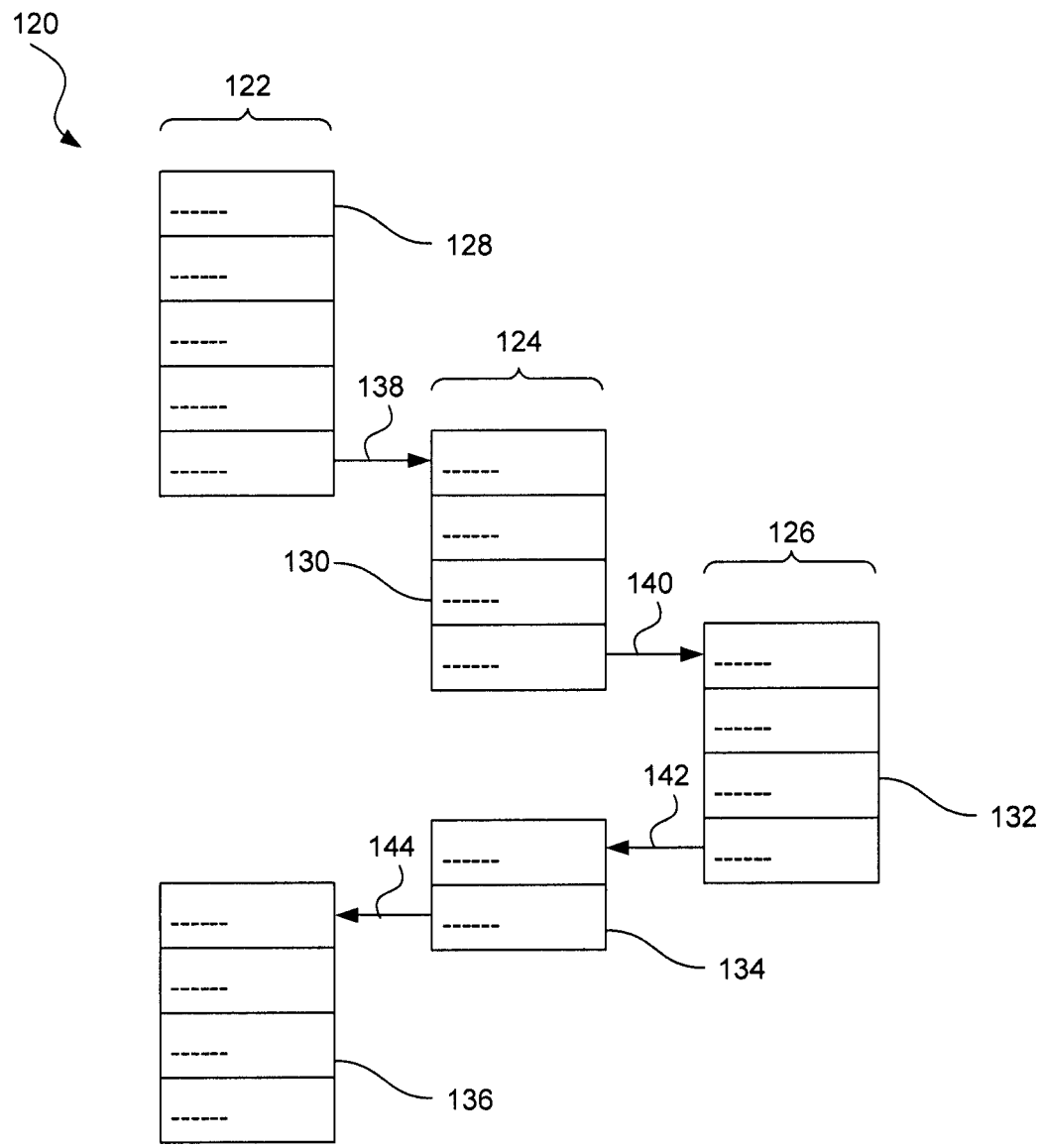
FIG. 1B is a diagram showing context switching, according to one example of principles described herein.

FIG. 1B is a diagram showing context switching. According to the present example, a physical processor is executing a set of instructions 128 while in the context 122 of the first virtual machine 110-1. In response to some occurrence, such as a halt instruction, the processor 104 performs a context switch 138 to the context 124 of the hypervisor 106. This is referred to as exiting the context 122 of the virtual machine 110-1 and entering the context 124 of the hypervisor 106. The processor 104 then executes a set of instructions 130 for the hypervisor 106. In some examples, another device, such as the second virtual machine 110-2, may have instructions that are pending execution. Thus, the processor 104 performs a context switch 140 to the context 126 of the second virtual machine 110-2 and executes instructions 132 for the second virtual machine 110-2. The second virtual machine 110-2 may then execute a halt instruction, or the hypervisor 106 may determine that other processes associated with other contexts have priority. Thus, a context switch 142 back to the hypervisor 106 occurs. The processor 104 then processes a set of instructions 134 for the hypervisor 106. The hypervisor 106 may perform some administrative functions before causing the processor 104 to perform a context switch 144 back to the context 122 of the first virtual machine 110-1.

As described above, halt instructions are typically executed when a processor is waiting for something to occur before execution is continued. For example, when the first virtual processor 108-1 executes a halt instruction, this may be done because the first virtual processor 108-1 is waiting on an event to occur. The virtual processor 108-1 is notified of such event by an interrupt signal. Thus, when the interrupt signal is received, if the processor 104 is not within the context of the virtual machine 110-1, the processor will have to switch back to the context of the virtual machine 110-1 before continuing execution. There are overhead costs associated with context switching. Particularly, the processor state has to be saved and a new processor state is loaded. Thus, it is preferable that the processor 104 already be in the context 122 of the first virtual machine 110-1 when the appropriate interrupt signal is received.

Returning to FIG. 1A, according to one example, the hypervisor 106 detects that a halt instruction is being executed by the virtual processor 108-1 of the virtual machine 110-1. The halt instruction may be part of the machine readable instructions forming the operating system or application of a guest 112-1. The halt instruction is intended to put a processor in a halt state until an expected event occurs, such as receiving an interrupt signal. Because the physical processor 104 may have instructions pending for processes associated with contexts outside the virtual machine 110-1, halting the virtual processor 108-1 does not cause a halt of the physical processor 104. Rather, halting the virtual processor 108-1 causes the physical processor 104 to switch from the context of the virtual processor 108-1 to a different context. Specifically, halting the virtual processor 108-1 may cause an exit from the virtual machine 110-1 to the hypervisor 106. While in the context of the hypervisor 106 various administrative tasks may be performed. From the context of the hypervisor 106, the physical processor may switch to the context of a different virtual machine 110-2 and begin executing instructions for the virtual processor 108-2 of that virtual machine 110-2. In some cases, the physical processor 104 may switch to a context associated with the host machine 102. For example, the operating system of the host machine may have pending instructions that await execution.

When the event for which the virtual processor 108-1 is waiting occurs, and the physical processor is not within the context of the virtual machine 110-1, the physical processor 104 will then switch to the context of the virtual machine 110-1 and then continue execution of the program on the virtual processor 108-1. There is some latency involved in the process of switching contexts due to various overhead processing costs. Thus, it is preferable that the physical processor 104 be in the context of the virtual machine 110-1 when the event occurs, if possible. By re-entering the context of the virtual machine 110-1 if no other instructions are pending for other contexts, the chances of the physical processor 104 being within the context of the virtual machine 110-1 when the event occurs is increased. Thus, the virtual processor 108-1 can more quickly begin to continue execution of its program.

Figure 2:
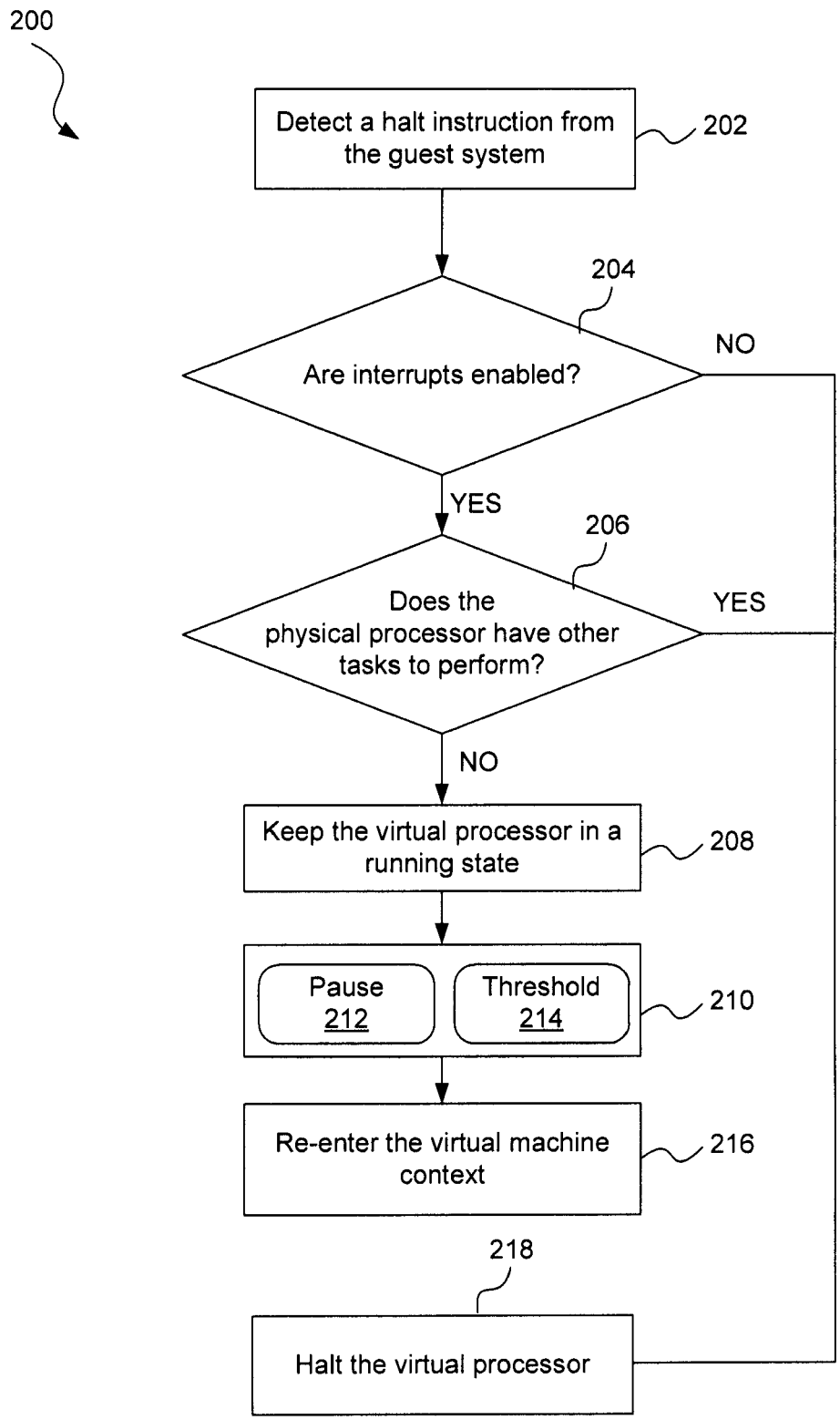
FIG. 2 is an illustrative flowchart for virtual machine context management, according to one example of principles described herein.

FIG. 2 is a diagram showing an illustrative flowchart virtual machine context management. According to the present example, the method 200 includes a step 202 for detecting that a halt instruction from the guest system is presented to the virtual machine for execution. For example, the machine readable instructions that comprise the guest operating system may include a halt instruction. The halt instruction is to cause the virtual processor to halt until a particular event occurs.

After detecting the halt instruction, at step 204, the hypervisor determines whether interrupts have been enabled for the physical processor. If interrupts have not been enabled, the hypervisor will halt the virtual processor as normal at step 218. But, if interrupts for the physical processor have been enabled, the method proceeds to the next step.

At step 206, the hypervisor determines if the physical processor has other tasks to perform. If there are other tasks that have to be performed, then the hypervisor will halt the virtual processor as normal at step 218. This allows for the physical processor to exit the context of the virtual machine and then perform whatever tasks are awaiting execution. But, if there are no other tasks that are awaiting execution, the hypervisor will keep the virtual processor in a running state and re-enter the context of the virtual machine. Thus, the hypervisor does not necessarily execute the halt instruction on the virtual processor.

In some examples, the hypervisor will perform an additional operation at step 210 before re-entering the virtual machine at step 216. For example, the hypervisor may execute a pause instruction 212 on the virtual processor. In the case of x86 architecture, the pause instruction can be the NOP instruction.

In some examples, the hypervisor may use a threshold amount of time to determine whether the virtual processor should be halted. For example, the hypervisor may determine the amount of time passed since the last halt instruction was executed on the virtual processor. If that amount of time exceeds a set threshold amount of time, then the hypervisor can halt the virtual processor even if interrupts are enabled and there are no other tasks to be performed on the processor. But, if the amount of time since the last halt instruction was executed on the virtual process is below the set threshold, then the method proceeds by re-entering the context of the virtual machine at step 216.

Figure 3A:
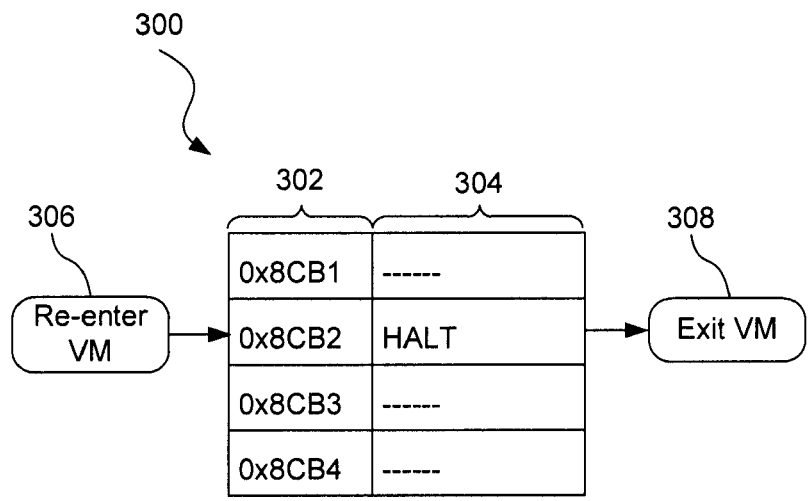
FIGS. 3A and 3B are diagrams showing an illustrative re-entering into a virtual machine context after a halt instruction, according to one example of principles described herein.
Figure 3B:
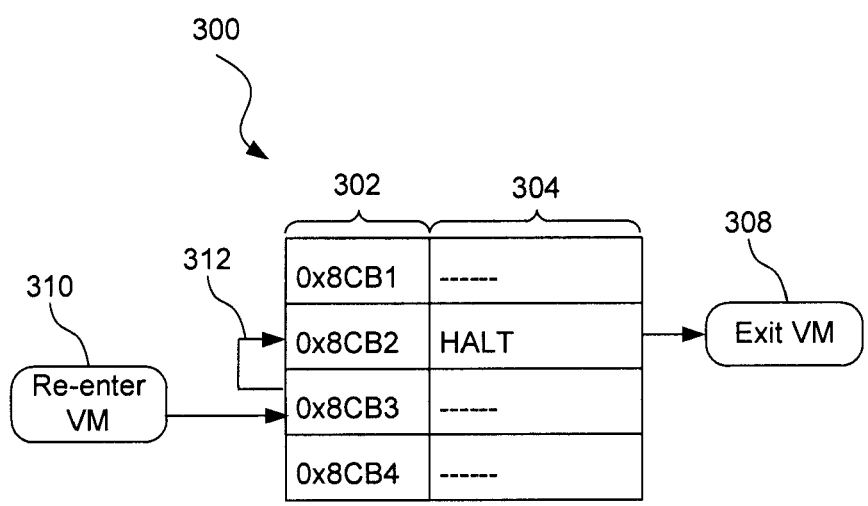

FIGS. 3A and 3B are diagrams showing an illustrative re-entering into a virtual machine context after a halt instruction. FIG. 3A illustrates re-entering the virtual machine at the same address as the halt instruction. FIG. 3A illustrates a table that includes memory addresses 302 and corresponding instructions 304 stored at those memory addresses 302. For example, if the halt instruction is at address 0x8CB2, then the virtual machine will be re-entered by fetching the instruction from address 0x8CB2. Machine readable instructions are typically read from a memory location by a processor. Generally, the processor will fetch instructions in order based on how the instructions are placed in memory. Thus, when the virtual processor fetches the halt instruction, this will cause the underlying physical processor to exit 308 the context of the virtual machine and enter the context of the hypervisor.

As described above, under certain conditions, the hypervisor will cause the processor to re-enter 306 the context of the virtual machine. This can be done by starting execution of the instructions 304 at the same memory address of the halt instruction. This, in turn, will trigger the process described above. This cycle may be continually repeated until the conditions are such that something else occurs. For example, if the physical processor has other tasks to perform, the virtual processor will be halted according to the halt instruction, and the processor will switch contexts to perform those other tasks. Or, if the event intended to take the virtual processor out of the halt instruction occurs, then execution of the machine readable instructions 304 may continue at an address subsequent to the halt instruction.

FIG. 3B illustrates re-entering the virtual machine at an address that is after the halt instruction. For example, if the halt instruction is at address 0x8CB2, then the virtual machine will be re-entered by fetching the instruction from address 0x8CB3. This will cause the guest to think there was a spurious wakeup. Thus, the guest will jump back 312 and re-execute the halt instruction at address 0x8CB2. This will cause the physical processor to exit 308 the context of the virtual machine. This, in turn, will trigger the process described above. The cycle of executing the halt instruction and performing the processes described above in association with FIG. 2 will be continually repeated until something occurs to cause a break in the cycle. For example, if the physical processor has other tasks to perform, the virtual processor will be halted according to the halt instruction, and the processor will switch contexts to perform those other tasks. Or, if the event intended to take the virtual processor out of the halt instruction occurs, then execution of the machine readable instructions 304 may continue at an address subsequent to the halt instruction.

By repeating the cycle described above, it is more likely that the physical processor will be in the context of the virtual machine when the event associated with the halt instruction occurs. This reduces latency because the processor will not have to switch from a different context to the context of the virtual machine when the event occurs.

Figure 4:
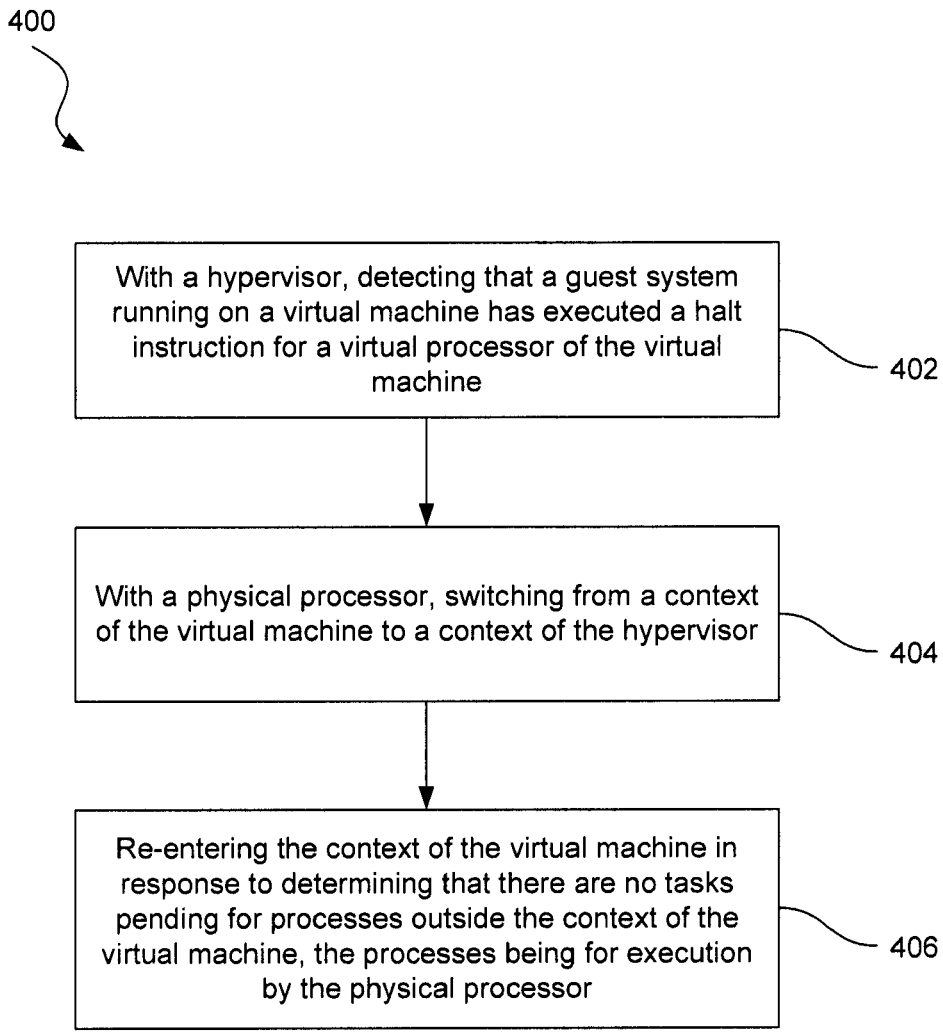
FIG. 4 is a flowchart showing an illustrative method for providing virtual machine context management upon a halt instruction, according to one example of principles described herein.

FIG. 4 is a flowchart showing an illustrative method for providing virtual machine context management upon a halt instruction. According to the present example, the method 400 includes, with a hypervisor, detecting 402 that a guest system running on a virtual machine has executed a halt instruction for a virtual processor of the virtual machine. The method further includes, with a physical processor, switching 404 from a context of the virtual machine to a context of the hypervisor. The method 400 further includes re-entering 406 the context of the virtual machine in response to determining that there are no tasks pending for processes outside the context of the virtual machine, the processes being for execution by the physical processor.

Some examples of processing systems described herein may include non-transient, tangible, machine readable media that include executable code that when run by one or more processors (e.g., processor 104) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   detecting a halt instruction for execution on a virtual processor of a virtual machine;
   with a physical processor, exiting a context of the virtual machine to a context of the hypervisor in response to detecting the halt instruction;
   after exiting the context of the virtual machine, determining that processor interrupts are enabled;
   keeping the virtual processor in an operating state in response to determining that the processor interrupts are enabled and determining that a time period between the halt instruction and when a last halt instruction was executed does not exceed a threshold time period;
   determining that there are no instructions outside the context of the virtual machine pending execution on the physical processor; and
   in response to determining that there are no instructions outside the context of the virtual machine pending execution on the physical processor, and before occurrence of an event intended to take the virtual processor out of a halt state, executing a pause instruction and then re-entering the context of the virtual machine without executing the halt instruction; and
   with the physical processor in the context of the virtual machine, receiving an interrupt indicating occurrence of the event intended to take the virtual processor out of the halt state.

2. The method of claim 1, further comprising, halting the virtual processor if the time period between the halt instruction and the previous time the virtual processor entered the halt state exceeds the threshold time period.

3. The method of claim 1, further comprising, determining that there are instructions for processes outside the context of the virtual machine pending execution on the physical processor, wherein the instructions pending execution comprise tasks for a hypervisor process.

4. The method of claim 1, further comprising, determining that there are instructions for processes outside the context of the virtual machine pending execution on the physical processor, wherein the instructions pending execution for processes outside the context of the virtual machine comprise tasks for a different virtual machine process.

5. The method of claim 1, wherein re-entering the context of the virtual machine comprises re-entering at a same address as the halt instruction.

6. The method of claim 1, wherein re-entering the context of the virtual machine comprises re-entering at an address subsequent to the halt instruction.

7. The method of claim 1, further comprising, before re-entering the context of the virtual machine, executing a waiting instruction.

8. The method of claim 1, further comprising, halting the virtual processor in response to determining that interrupts are not enabled.

9. The method of claim 1, further comprising:
in response to determining that there are instructions for processes outside the context of the virtual machine pending execution on the physical processor, executing the instructions for processes outside the context of the virtual machine.

10. The method of claim 1, further comprising, determining that there are instructions for processes outside the context of the virtual machine pending execution on the physical processor, wherein the instructions outside the context of the virtual machine pending execution for processes outside the context of the virtual machine comprise tasks for a host machine associated with the physical processor.

11. A computing system comprising:
a processor; and
a memory comprising computer readable instructions that when executed by the processor, cause the system to:
run a hypervisor to host a virtual machine;
detect a halt instruction for execution by a virtual processor;
cause the processor to exit a context of the virtual machine in response to detecting the halt instruction;
after exiting the context of the virtual machine, determine that processor interrupts are enabled;
keep the virtual processor in an operating state in response to determining that the processor interrupts are enabled and determining that a time period between the halt instruction and when a last halt instruction was executed does not exceed a threshold time period;
determine that there are no instructions outside the context of the virtual machine pending execution on the processor; and
in response to determining that there are no instructions outside the context of the virtual machine pending execution on the physical processor, and before occurrence of an event intended to take the virtual processor out of a halt state, execute a pause instruction and then re-enter the context of the virtual machine without executing the halt instruction; and
with the physical processor in the context of the virtual machine, receive an interrupt indicating occurrence of the event intended to take the virtual processor out of the halt state.

12. The system of claim 11, wherein the processor is to further cause the system to determine that there are instructions for processes outside the context of the virtual machine pending execution on the processor, wherein the processor is to further cause the system to halt the virtual processor in response to determining that another virtual machine has pending instructions for the processor.

13. The system of claim 11, wherein the processor is to further cause the system to halt the virtual processor if it is determined that interrupts are not enabled.

14. The system of claim 11, wherein the processor is further to cause the system to re-enter the context of the virtual machine at an address that is at or after an address of the halt instruction.

15. The system of claim 11, wherein the processor is to further cause the system to determine that there are instructions for processes outside the context of the virtual machine pending execution on the processor, wherein the instructions for processes outside the context of the virtual machine pending execution on the processor are associated with a different virtual machine.

16. A method performed by a physical computing system, the method comprising:
detecting that a guest system running on a virtual machine has provided a halt instruction for execution on a virtual processor of the virtual machine;
with a physical processor of the physical system, switching from a context of the virtual machine to a context of the hypervisor in response to detecting the halt instruction;
after exiting the context of the virtual machine, determining that processor interrupts are enabled; and
executing a pause instruction and then re-entering the context of the virtual machine without executing the halt instruction, and before occurrence of an event intended to take the virtual machine out of a halt state and in response to the determining that:
interrupts are enabled;
a time period between the halt instruction and when a last halt instruction was executed does not exceed a threshold time period; and
there are no instructions pending for processes outside the context of the virtual machine pending execution on the physical processor; and
with the physical processor in the context of the virtual machine, receiving an interrupt indicating occurrence of the event intended to take the virtual processor out of the halt state.

17. The method of claim 16, wherein re-entering the context of the hypervisor comprises re-entering the context of the virtual machine at an address that is at or after an address of the halt instruction.

18. The method of claim 16, wherein re-entering the context of the virtual machine in response to determining that further comprises:
there are instructions pending execution for processes outside the context of the virtual machine on the physical processor, wherein the instructions pending for processes outside the context of the virtual machine are associated with a different virtual machine.

* * * * *